Feb. 15, 1955　　　　M. DEWHURST　　　　2,702,101
SPRING ACTUATED ELECTROMAGNETIC BRAKE
Filed Dec. 4, 1951　　　　　　　　　　2 Sheets-Sheet 1

FIG. I.

Inventor
MELBOURNE DEWHURST

By　　　　　　　　Attorney

Feb. 15, 1955  M. DEWHURST  2,702,101
SPRING ACTUATED ELECTROMAGNETIC BRAKE
Filed Dec. 4, 1951  2 Sheets-Sheet 2

Inventor
MELBOURNE DEWHURST
By
Attorney

United States Patent Office 2,702,101
Patented Feb. 15, 1955

2,702,101

SPRING ACTUATED ELECTROMAGNETIC BRAKE

Melbourne Dewhurst, Hounslow, England, assignor to Dewhurst and Partner Limited, Hounslow, England, a British company Application December 4, 1951, Serial No. 259,841

Claims priority, application Great Britain December 5, 1950

8 Claims. (Cl. 188—171)

This invention relates to electromagnetic and other brakes of the kind in which the brake is held in the operated position by means of spring pressure and is released by an electromagnet, foot pedal mechanism or other device, the brake blocks being arranged on pivoted levers which are normally forced towards each other by spring pressure. The spring pressure may be provided by a compression spring arranged below the pivots or a tension spring arranged above the pivots and these levers are forced apart when required by a rod or the like which is operated by the releasing means.

One example of such a brake is that described and shown in my British Patent No. 433,504, and one object of the present invention is to provide an improved construction of control arrangement to that shown in the aforesaid specification.

According to the present invention there is provided a control arrangement for a brake of the kind specified, in which the rod or the like which is coupled to one of the pivoted levers co-operates with a first member having a surface in frictional engagement with a surface of a second member, said second member being coupled resiliently to the other of the pivoted levers, the surface of one of the members lying in a plane which is inclined to the axis of the rod or the like at an angle whose tangent is not greater than the co-efficient of friction between said surfaces, the arrangement being such that axial movement of the rod or the like in a predetermined direction relative to its associated brake lever produces a corresponding movement of said first member which due to its frictional engagement with said second member causes said brake levers to be forced apart thereby releasing the brake.

The resilient coupling between the second member and its associated brake lever serves to take up the wear of the brake blocks so that the levers can move closer together as wear occurs, thus making the brake self adjusting.

One particular construction of the brake control arrangement will now be described by way of example only, in which the brake is electromagnetically operated, reference being made to the accompanying drawings, in which.

Figure 1:
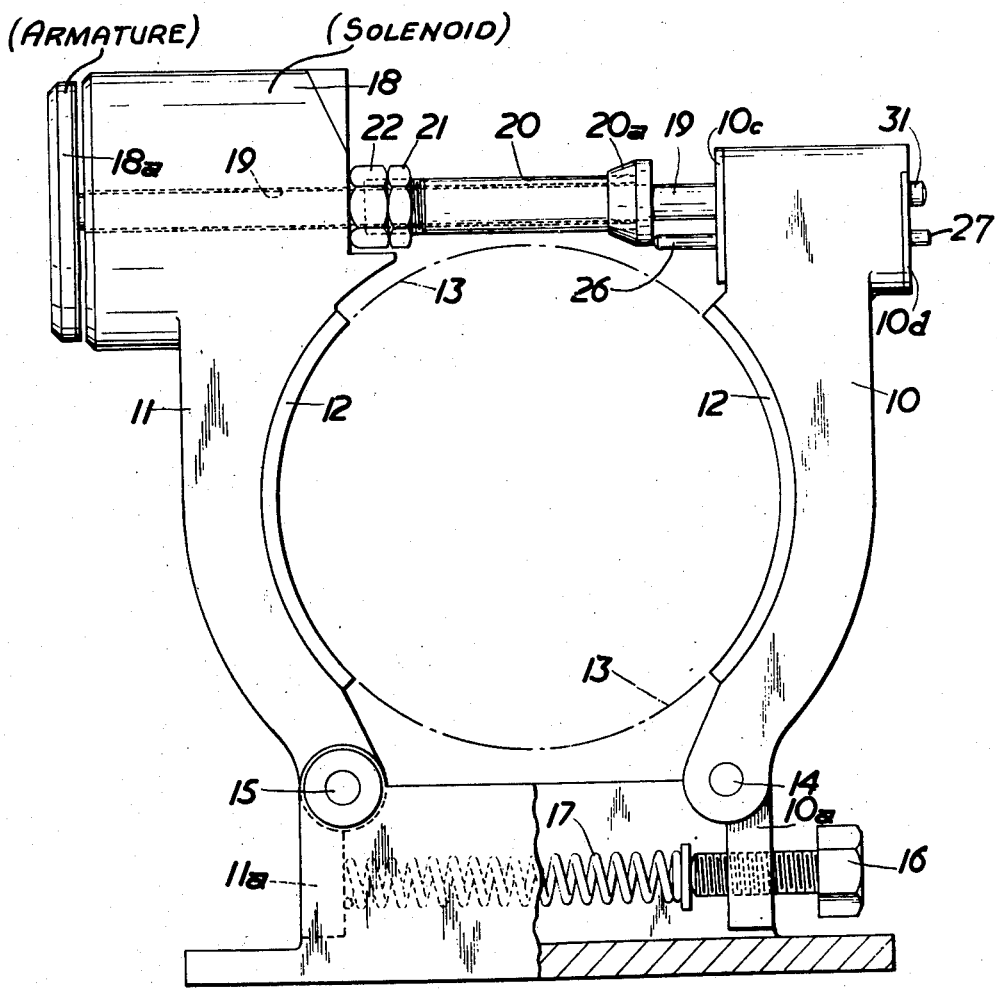
Figure 1 is a side view of the complete brake mechanism.
Figure 2:
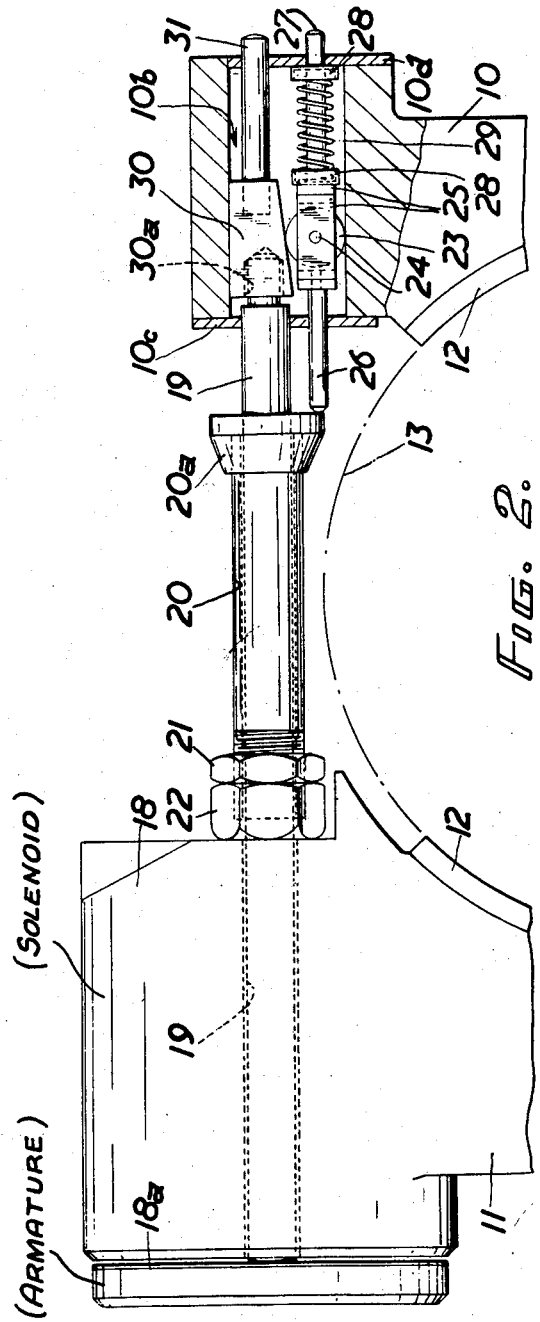
Figure 2 is a detail view, partly in section, on an enlarged scale of the brake operating part of the mechanism.

Referring now to the drawings, there are shown brake levers 10, 11 which each carry a brake block 12. The brake blocks 12 are adapted to engage a drum mounted on the apparatus with which the brake is to be used, the drum periphery being represented by the broken lines 13. The levers 10, 11 are mounted on pivots 14, 15 respectively and have extension 10a, 11a respectively. The lever extension 10a carries an adjustable screw 16 which engages one end of a compression spring 17 whose other end engages the lever extension 11a. The compression spring 17 serves to pivot the levers 10 and 11 so that the brake blocks 12 are urged towards one another and thereby, when mounted adjacent a drum, into engagement with the drum to effect braking thereof.

This arrangement of the brake levers is similar to that shown and described in my aforesaid British patent. The control arrangement for releasing the brake is, however, different from that shown in the aforesaid specification, and will now be described.

The upper portion of the lever 11 carries a solenoid 18 and is bored to accommodate an axially movable rod 19, the latter being secured to the armature 18a of the solenoid 18 so that when the solenoid 18 is energised the rod 19 is moved axially towards the lever 10 as a result of the attraction of the armature 18a. A distance tube 20 fits freely on the rod 19, the distance tube being provided with a collar 20a at one end and a pair of nuts 21, 22 at the other end which is screwthreaded. The nuts 21 and 22 are positioned so that the nut 22 overhangs the end of the distance tube 20.

The upper end of the lever 10 is provided with a recess 10b closed by front and back plates 10c and 10d. The recess 10b accommodates a roller 23 which rests on the floor of the recess 10b and is fitted on an axle 24 carried by a rectangular cage 25. A thrust rod 26 fits in one end of the cage 25 and passes freely through the front plate 10c, whilst a locating pin 27 fits in the other end of the cage 25 and passes freely through the back plate 10d. Washers 28 capture a spring 29 between the back plate 10d and the adjacent end of the cage 25. The recess 10b also accommodates a block 30 having an inclined lower surface which engages the periphery of the roller 23 so that there is a line contact therebetween.

A hole 30a is provided in the inwardly facing side of the block 30 and the free end of the rod 19 fits loosely in this hole 30a so as to permit angular movement between the rod 19 and block 30 when the levers 10 and 11 move relatively to one another. A positioning pin 31 is secured in the opposite side of the block 30 and passes freely through the back plate 10d, this pin 31 being provided to facilitate manual movement of the block 30 during setting-up or adjusting operations.

The control arrangement works in the following manner. When the solenoid 18 is energised the rod 19 moves axially towards the lever 10. Because the free end of the rod 19 fits into the block 30, the block 30 also moves, the rod 19 and block 30 together constituting in effect a strut. However, relative movement between the block 30 and roller 23 is not possible because of the wedging action between the block 30 and roller 23, so that the upper end of lever 10 moves with the block 30 thereby releasing the brake.

As wear occurs in the brake shoes 12, resulting in movement of the upper ends of the levers 10 and 11 towards one another, the roller 23 will move backwards towards the back plate 10d, due to its connection with the lever 12 via the thrust rod 26 and distance tube 20, thereby increasing the compression of the spring 29. The block 30 will move relative to the front plate 10c to a like extent because of its engagement with the rod 19, but will not move relative to the rod 19, so that the extent of separation of the levers 10 and 11 upon energisation of the solenoid will be unaffected. In this way the brake is self-adjusting for wear.

The nuts 21 and 22 on the distance tube 20 can be adjusted during setting-up or subsequent adjustments to position correctly the roller 23.

It will be understood that to prevent slipping between the engaged surfaces of the block 30 and roller 23 during release of the brakes, the tangent of the angle of inclination of the inclined surface of the block 30 to the lower surface of the recess 10b on which the roller 23 rests must be not greater than the coefficient of friction between the surfaces of the block and roller. If the angle were too great the roller 23 would be pushed by the block 30 instead of the wedging action occurring; rolling of the roller 23 must only take place when wear of the blocks is being taken up.

In an alternative arrangement the roller 23 may be replaced by a block similar to the block 30 and having its inclined surface in contact with the inclined surface of the block 30.

Where the brake is to be operated electromagnetically in conjunction with equipment operating from alternating current and no rectified current is available, a contactor may be used whose armature is coupled to the rod to produce the desired movement. Where operation is to be effected by other than electromagnetic means, the appropriate operating means can be suitably coupled to the rod 19.

What is claimed, is:

1. A brake comprising a brake drum, brake shoes engageable with the periphery of said brake drum on opposite sides thereof, two pivotally mounted levers supporting said brake shoes, spring means biasing said pivoted levers towards each other for urging said brake shoes against said brake drum, strut means, a slideway means on one of said levers, one end of said strut means being slidably guided in said slideway means, said strut means sliding with one side upon a surface of said slideway, the opposite side of said strut means having an inclined surface spaced apart from an adjacent surface of said slideway means, a wheel disposed in said slideway means between said inclined surface and said adjacent surface of the slideway means, a member rotatably supporting said wheel disposed within the slideway means, means biasing said member along said slideway means into a position in which said wheel is in engagement with said inclined surface and said adjacent surface, brake-release means coacting with said strut means for moving the latter longitudinally relative to the second lever and toward the first lever thereby forcing said levers apart in opposition to said spring means owing to jamming of said wheel between the respective surfaces, and stop means for arresting, upon return of said levers towards each other by said spring means, said member in a predetermined position within the slideway means in which said wheel is unjammed.

2. A brake comprising a brake drum, brake shoes engageable with the periphery of said brake drum on opposite sides thereof, two pivotally mounted levers supporting said brake shoes, spring means biasing said pivoted levers towards each other for engagement of said brake shoes with said brake drum, a strut, a slideway means on one of said levers, one end of said strut being slidably guided in said slideway means, said strut sliding with one side upon a surface of said slideway means, the opposite side of said strut having an inclined surface spaced apart from an opposite surface of said slideway means, a wheel in said slideway disposed between said inclined surface and said adjacent surface of the slideway means, a member rotatably supporting said wheel, means biasing said member along said slideway and into a position in which said wheel is in engagement with said inclined surface of said strut and said adjacent surface of said slideway means, a solenoid mounted on the second lever, an armature mounted on said strut and coacting with said solenoid for axially moving, upon energisation of said solenoid, said strut relative to the second lever and toward said first lever thereby forcing said levers apart in opposition to said spring means owing to jamming of said wheel between the respective surfaces, and stop means for arresting, upon return of said levers towards each other by said spring means, said member in a predetermined position within the slideway means in which said wheel is unjammed.

3. A brake according to claim 1, wherein the stop means are adjustable for varying said predetermined position of said member within the slideway means.

4. A brake comprising a brake drum, brake shoes engageable with the periphery of said brake drum on opposite sides thereof, two pivotally mounted levers supporting said brake shoes, spring means biasing said pivoted levers towards each other for urging said brake shoes against said brake drum, a strut, a slideway means on one of said levers, one end of said strut being slidable in said slideway, said strut sliding with one side upon a surface of said slideway means, the opposite side of said strut having an inclined surface spaced apart from an opposite surface of said slideway means, a wheel in said slideway means disposed between said inclined surface and said opposite surface, a member rotatably supporting said wheel, means biasing said member along said slideway means and into a position in which said wheel engages said inclined surface of said strut and said opposite surface of said slideway means, brake-release means coacting with said strut for moving the latter longitudinally relatively to the second lever and toward the first lever thereby forcing said levers apart, in opposition to said spring means, owing to jamming of said wheel between the respective surfaces, and a sleeve embracing said strut, one end of said sleeve engaging said second lever, and the other end of said sleeve forming a stop whereby, upon return of said levers towards each other by said spring means, said member is arrested at a given distance from said second lever at which said wheel is unjammed.

5. A brake according to claim 4, wherein the effective length of said sleeve is variable for adjusting said given distance.

6. A brake comprising a brake drum, brake shoes engageable with the periphery of said brake drum on opposite sides thereof, two pivotally mounted levers supporting said brake shoes, spring means biasing said pivoted levers towards each other for engagement of said brake shoes with said brake drum, a strut, a slideway means on one of said levers, one end of said strut being slidable in said slideway, said strut sliding with one side upon a surface of said slideway means, the opposite side of said strut having an inclined surface spaced apart from an opposite surface of said slideway, a roller in said slideway means disposed between said inclined surface and said opposite surface, means biasing said roller along said slideway means and into engagement with said inclined surface and said opposite surface, brake-release means coacting with said strut for axially moving the latter relative to the second lever and toward the first lever thereby forcing said levers apart in opposition to said spring means, owing to jamming of said roller between the respective surfaces, and stop means for arresting, upon return of said levers towards one another by said spring means, said roller at a distance from said second lever at which said roller is unjammed.

7. A brake comprising a brake drum, brake shoes engageable with the periphery of said brake drum on opposite sides thereof, two pivotally mounted levers supporting said brake shoes, spring means biasing said pivoted levers towards each other for engagement of said brake shoes with said brake drum, a slideway means on one of said levers, a block slidable in said slideway, one side of said block slidably engaging a surface of said slideway means, and the opposite side of said block having an inclined surface spaced from an opposite surface of said slideway means, a wheel in said slideway means disposed between said inclined surface and said opposite surface, a member supporting said wheel, means biasing said member along said slideway means and into a position in which said wheel engages said inclined surface of said block and said opposite surface of said slideway means, a rod, one end of said rod engaging loosely in a recess in one end of said block, brake-release means coacting with said rod for axially moving the same relative to the second lever and toward the first lever thereby to force said levers apart in opposition to said spring means owing to jamming of said wheel between the respective surfaces, and stop means for arresting, upon return of said levers towards each other by said spring means, said member at a given distance from said second lever at which said wheel is unjammed.

8. A brake comprising a brake drum, brake shoes engageable with the periphery of said brake drum on opposite sides thereof, two pivotally mounted levers supporting said brake shoes, spring means biasing said pivoted levers towards each other for engagement of said brake shoes with said brake drum, a slideway means on one of said levers, a block slideable in said slideway means, one side of said block slidably engaging a surface of said slideway means, and the opposite side of said block having an inclined surface spaced from an opposite surface of said slideway means, a wheel in said slideway means disposed between said inclined surface and said opposite surface, a member rotatably supporting said wheel, means biasing said member along said slideway means and into a position in which said wheel engages said inclined surface and said opposite surface, a rod, one end of said rod engaging loosely in a recess in one end of said block, brake-release means coacting with said rod for moving the latter longitudinally relative to the second lever and toward the first lever thereby to force said levers apart, in opposition to said spring means, owing to jamming of said wheel between the respective surfaces, a sleeve embracing said rod, one end of said sleeve engaging said second lever, and the other end of said sleeve forming a stop for arresting, upon return of said levers towards one another by said spring means, said member at a given distance from said second lever at which said wheel is unjammed, and means for varying the effective length of said sleeve for adjusting said given distance.

References Cited in the file of this patent

UNITED STATES PATENTS

| 1,929,914 | Coberly et al. | Oct. 10, 1933 |

FOREIGN PATENTS

| 102,292 | Sweden | Aug. 12, 1941 |
| 133,571 | Austria | May 26, 1933 |
| 503,776 | Great Britain | Apr. 11, 1939 |